Patented Aug. 26, 1947

2,426,158

UNITED STATES PATENT OFFICE 2,426,158

ALIPHATIC NITRO DERIVATIVES OF CYANOACETIC ESTERS AND METHOD FOR PREPARING THEM

Carl T. Bahner, Jefferson City, Tenn.

No Drawing. Application June 13, 1945, Serial No. 599,304

11 Claims. (Cl. 260—464)

This invention relates to new reaction products of certain cyanoacetic esters with nitroolefines, and to a method for preparing them. It relates more particularly to compounds having the following structural formula:

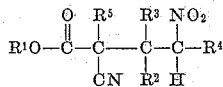

wherein $R^1$ represents an alkyl group, $R^2$, $R^3$, $R^4$, and $R^5$ are members selected from the group consisting of hydrogen and alkyl radicals.

Among the compounds included in the above formula the following may be mentioned by way of illustration: ethyl 4-nitro-3,3-dimethyl-2-cyanobutyrate; ethyl 4-nitro-2,3-diethyl-2-cyanobutyrate; ethyl 4-nitro-3-ethyl-2-cyanocaproate; ethyl 4-nitro-2-cyanocaproate, and the like.

In practicing my invention, I react a cyanoacetic ester with a nitroolefine in alkaline solution. I may first convert a part or all of the cyanoacetic ester to an alkali metal derivative for example, by first dissolving sodium or potassium metal in alcohol and adding the sodium alcoholate to the cyanoacetic ester, or I may use a basic catalyst such as an aliphatic amine to activate the methylene hydrogen of the cyanoacetic ester. However, I prefer to use alkali metal derivatives of the cyanoacetic ester, especially in the reactions involving aliphatic nitroolefines such as 2-nitro-1-butene and 1-nitro-1-pentene and the like. However, the branched chain aliphatic nitroolefines such as 1-nitro-2-methyl-1-propene and the like lend themselves readily to the use of an aliphatic amine catalyst such as triethylamine. The reaction may be carried out by utilizing equivalent proportions of the reactants, or an excess of the cyanoacetic ester may be used, for example, I may use an excess of the cyanoacetic ester as a reaction medium. Or, if desired a mutual solvent, inert to the reaction such as dioxane, ethyl or methyl alcohol or the like may be used for this purpose. The reactants are preferably mixed portionwise to prevent too violent reaction and to reduce the tendency to polymer formation. Cooling may be employed to maintain the temperature within the desired range, preferably below about 35° C. After the reactants have been mixed, the mixture is allowed to stand for a sufficient length of time to insure substantially complete reaction to take place. If the cyanoacetic ester is used in the form of its sodium derivative, the reaction product will be present at this point in the form of its sodium salt, and may be recovered in this form if desired. Otherwise, the mixture may be acidified at this point, for example, with acetic acid to convert the alkali metal salt to the free product. After removal of the alkali metal byproducts the substituted cyanoacetic ester may be recovered by any desired means such as dissolving in a solvent, by distillation, by converting into other derivatives, or the like.

The cyanoacetic esters which I may use in practicing my invention have the following structural formula:

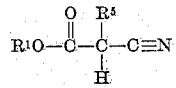

wherein $R^1$ represents an alkyl group and $R^5$ is a member selected from the group consisting of hydrogen and alkyl.

The nitroolefines which are operative in my reaction include nitroethylene and its alkyl substituted derivatives having the following formula:

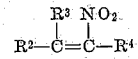

wherein $R^2$, $R^3$ and $R^4$ are members selected from the group consisting of hydrogen and alkyl radicals. Among the compounds included by the above formula there may be mentioned nitroethylene; 2-nitropropene; 1-nitro-1-propene; 1-nitro-1-butene; 2-nitro-2-butene; 1-nitro-1-pentene; 3-nitro-3-hexene; 2-nitro-1-butene; 1-nitro-2-methyl-1-propene; and the like.

The following specific examples will further illustrate my invention.

Example I

To a solution prepared by dissolving 2 parts of sodium in 67 parts by weight of absolute ethanol was added 11.3 parts of ethyl cyanoacetate. To the suspension thus formed was added 10 parts of 2-nitro-1-butene portionwise. The solution was stirred vigorously and the temperature maintained between about 19° C. and 24° C. by means of an ice bath. After about 25 minutes the mixture was acidified by the addition of 6 parts of glacial acetic acid. The mixture was allowed to stand for about an hour and a half and then diluted to 500 parts with water and two liquid layers allowed to separate. The oily layer was washed with water, diluted with an equal volume of benzene and again washed. The benzene was distilled off and the remainder of the product distilled under reduced pressure. The ethyl 4-nitro- 2-cyanocaproate distilled at 135° C. at a pressure of 1 millimeter and was found to have a refractive index of 1.451. Carbon content found was 50.51% as compared to a theoretical value of 50.46%. Hydrogen found was 6.86% as compared to a theoretical value of 6.59%. The compound has the structure given below:

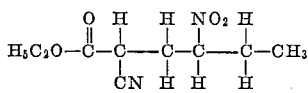

*Example II*

To a mixture of 7 parts of ethyl cyanoacetate and 0.3 part of triethylamine was added portionwise 3.2 parts of 1-nitro-2-methyl-1-propene over a period of one hour while maintaining the temperature below about 30° C. by means of an ice bath. The mixture was allowed to stand for 48 hours and was then distilled at 20 mm. pressure until the triethylamine and some ethyl cyanoacetate was removed, whereupon 6.2 parts of product was obtained, boiling at 95–125° C. at 1 mm. Distillation of this fraction at 1 mm. pressure yielded 1.5 parts of ethyl 4-nitro-3,3-dimethyl-2-cyanobutyrate boiling at 110–111° C. at 1 mm. pressure. The product had the following properties: $n_d^{25}=1.453$; $d_4^{25}=1.145$. Carbon found 50.47%, calculated 50.46%. Hydrogen found 6.55%, calculated 6.59%. The compound has the structure given below:

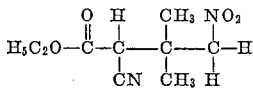

*Example III*

A solution of the sodium derivative of ethyl ethylcyanoacetate was prepared by adding 10 parts of ethyl ethylcyanoacetate to a solution formed by reacting 1.4 parts of sodium with 32 parts by weight of absolute ethyl alcohol. To this solution 5 parts of 1-nitro-1-butene were added portionwise and the mixture maintained at a temperature between about 30–35° C. by means of external cooling. The addition of reactants was carried out over a ten minute interval and the mixture was then allowed to stand for 15 minutes, cooled to 10° C., and acidified by the addition of 4 parts of acetic acid. The mixture was then diluted with 200 parts of water and two liquid layers allowed to separate. To the oil layer was added 20 parts of benzene and the mixture was washed with several portions of water. The mixture was then distilled to remove benzene at 20 mm. pressure and the distillation continued at 1 mm. pressure whereupon 4.7 parts of ethyl 4-nitro-2,3-diethyl-2-cyanobutyrate were obtained at a temperature of 129–132° C. at 1 mm. pressure. The properties of the product were: $n_D^{25}=1.453$; $D^{25}=1.097$. Carbon found 54.06%, theoretical 54.53%. Hydrogen found 7.45%, theoretical 7.49%. The compound has the structure given below:

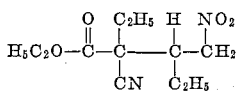

While the above describes the preferred embodiments of my invention it will be understood that departures may be made therefrom within the scope of the specification and claims.

What is claimed is:

1. As new compositions of matter the substituted cyanoacetic esters having the following structural formula:

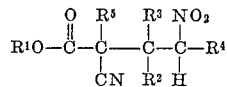

wherein $R^1$ represents a lower alkyl group, and $R^2$, $R^3$, $R^4$, and $R^5$ are members selected from the group consisting of hydrogen and lower alkyl radicals.

2. Ethyl 4-nitro-2-cyanocaproate.
3. Ethyl 4-nitro-3,3-dimethyl-2-cyanobutyrate.
4. Ethyl 4-nitro-2,3-diethyl-2-cyanobutyrate.
5. In a process for preparing substituted cyanoacetic esters having the following structural formula:

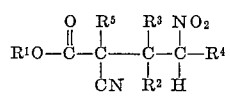

wherein $R^1$ represents a lower alkyl group, and $R^2$, $R^3$, $R^4$, and $R^5$ are members selected from the group consisting of hydrogen and lower alkyl radicals, the steps which comprise reacting in the presence of an alkaline catalyst a cyanoacetic ester having the following formula:

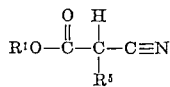

wherein $R^1$ represents a lower alkyl group, and $R^5$ is a member selected from the group consisting of hydrogen and lower alkyl; with a nitroolefine having the following formula:

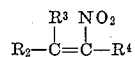

wherein $R^2$, $R^3$ and $R^4$ are members selected from the group consisting of hydrogen and lower alkyl radicals.

6. The process of claim 5 wherein the alkaline catalyst is an alkali metal derivative of the cyanoacetic ester.

7. The process of claim 5 wherein the alkaline catalyst is an aliphatic amine.

8. In a process for preparing substituted cyanoacetic esters having the following structural formula:

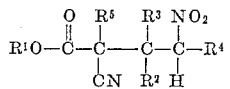

wherein $R^1$ represents a lower alkyl group, and $R^2$, $R^3$, $R^4$, and $R^5$ are members selected from the group consisting of hydrogen and lower alkyl radicals, the steps which comprise preparing an alkali metal derivative of a cyanoacetic ester having the formula

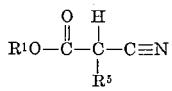

wherein $R^1$ represents a lower alkyl group, and $R^5$ is a member selected from the group consisting of hydrogen and lower alkyl; and reacting said alkali metal derivative with a nitro-olefine having the following formula

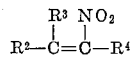

wherein $R^2$, $R^3$ and $R^4$ are members selected from the group consisting of hydrogen and lower alkyl radicals.

9. In a process for preparing ethyl 4-nitro-2-cyanocaproate, the steps which comprise reacting ethyl cyanoacetate with 2-nitro-1-butene in the liquid phase in the presence of an alkaline catalyst.

10. In a process for preparing ethyl 4-nitro-3,3-dimethyl-2-cyanobutyrate, the step which comprises reacting ethyl cyanoacetate with 1-nitro-2-methyl-1-propene in the liquid phase in the presence of an alkaline catalyst.

11. In a process for preparing ethyl 4-nitro-2,3-diethyl-2-cyanobutyrate, the step which comprises reactinng ethyl ethylcyanoacetate with 1-nitro-1-butene in the liquid phase in the presence of an alkaline catalyst.

CARL T. BAHNER.

REFERENCES CITED

The following references are of record in the file of this patent:

UNITED STATES PATENTS

| Number | Name | Date |
|---|---|---|
| 2,361,259 | Bruson | Oct. 24, 1944 |
| 2,328,370 | Wiest | Aug. 31, 1943 |

OTHER REFERENCES

Conrad et al., Beilstein (4th ed., 1920), vol. II, p. 598.

Wulff et al., A. P. C. Spec. 404,150, Apr. 20, 1943.